(No Model.)

C. DIEBOLD.
MACHINE FOR MAKING PAVING AND BUILDING BLOCKS.

No. 287,011. Patented Oct. 23, 1883.

WITNESSES:
Jo. P. Grant,
W. F. Kirches

INVENTOR:
Charles Diebold,
BY John A. Diedersheim
ATTORNEY.

UNITED STATES PATENT OFFICE.

CHARLES DIEBOLD, OF LEBANON, PENNSYLVANIA.

MACHINE FOR MAKING PAVING AND BUILDING BLOCKS.

SPECIFICATION forming part of Letters Patent No. 287,011, dated October 23, 1883.

Application filed July 23, 1883. (No model.)

*To all whom it may concern:*

Be it known that I, CHARLES DIEBOLD, a citizen of the United States, residing at Lebanon, in the county of Lebanon, State of Pennsylvania, have invented a new and useful Improvement in Machines for Making Paving and Building Blocks, which improvement is fully set forth in the following specification and accompanying drawings, in which—

Figure 1:
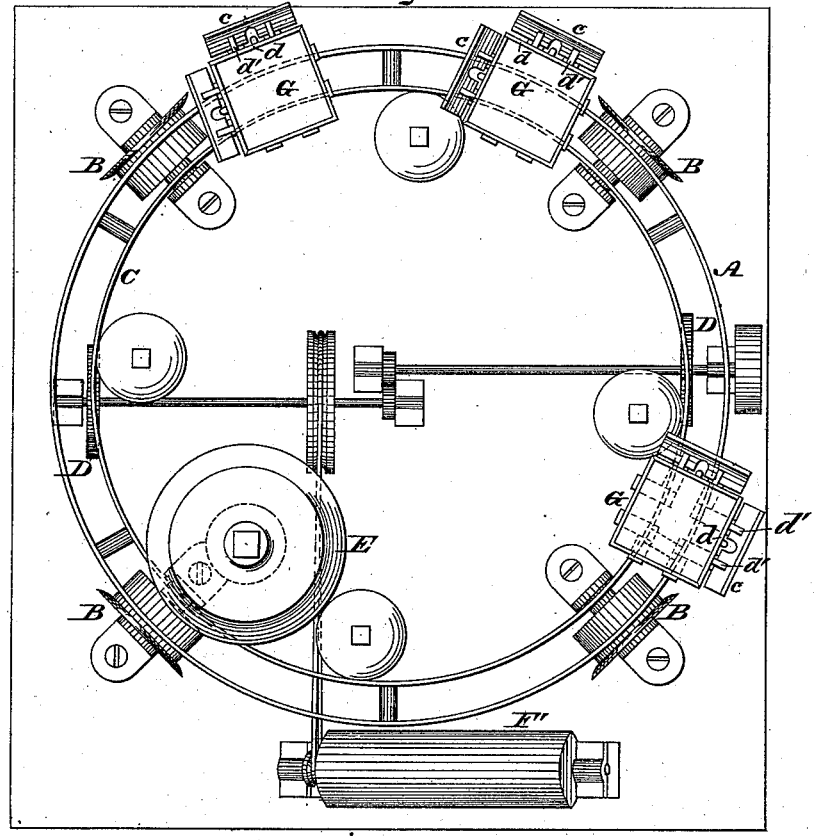
Figure 2:
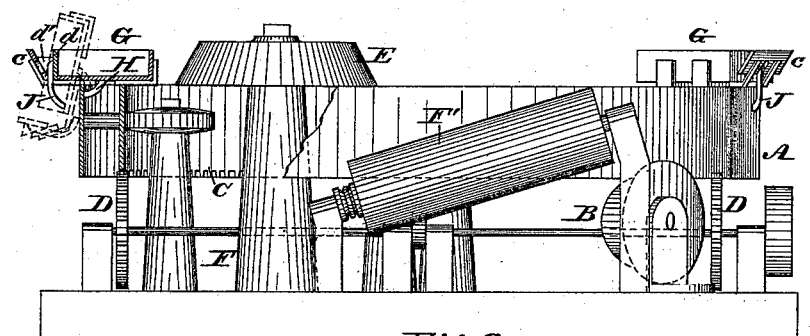
Figure 3:
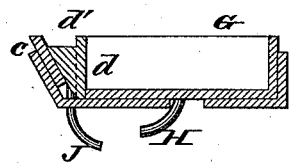

Figure 1 is a plan view of a machine for making blocks embodying my invention. Fig. 2 is a side view thereof, partly sectional. Fig. 3 is a section of the mold thereof, enlarged, in line $x$ $x$, Fig. 1.

Similar letters of reference indicate corresponding parts in the several figures.

My invention consists of a machine for making paving and building blocks, having means whereby the mold is automatically tilted, canted, or overturned, so as to cause the discharge of the contents thereof.

It also consists of means for restoring the mold to its normal position, so that it may be refilled.

It also consists of the construction of the mold, whereby one or more of the sides thereof may be relieved, in order to cause the block to be unfailingly discharged.

Referring to the drawings, A represents an annular carriage, which is properly supported on rollers B.

C represents a rack, which is secured to or formed with the carriage A; and D represents pinions which mesh with said rack and receive power in any suitable manner. In lieu of the rack and pinion C D, I may use friction-wheels or other devices for rotating the carriage A.

E represents a conical roller, which is supported by means of a vertical axis on a standard or support, F, the periphery of the same overhanging the inner periphery of the carriage A; and F' represents an obliquely-arranged roller, which is mounted adjacent to the outer periphery of the carriage, and receives motion from the gearing of the machine.

G represents a mold, which is located on the carriage A, and has on its under side depending hooks H, which, when the mold is in horizontal or normal position, are located adjacent to the outer periphery of the carriage, it being noticed that in the present case the carriage is formed of two concentric bands, although the same may be made solid and have an upwardly-projecting rim or flange on the outer periphery, so that said hooks H may engage therewith, as will be hereinafter set forth. The mold has also rigidly secured to it an inclined side, $c$, which, it will be seen, is outside of the side proper of the mold, the location of said side being such that when the mold reaches the roller F' the inclined side strikes the same and serves to lift the same, for purposes to be explained. The side $d$ of the mold adjacent to the inclined side $c$ is loosely fitted in position, and has secured to or formed with its back lugs $d'$ $d'$, which rest against the inclined side $c$, thus holding the side $d$ firmly in upright position, so that the block may be properly shaped, and said side $d$ has depending from it a foot, J, which passes through an opening between the base of the mold and bottom of the inclined side $c$, and projects inwardly toward the outer periphery of the carriage. When power is applied to the carriage the molds, which are properly filled with material from which to make the blocks, are carried therewith, and when a mold reaches the conical roller E its inner end rises on the face of said roller, whereby the mold is overturned, tilted, or canted outwardly, the hooks H catching over the outer rim or band of the carriage, forming hinges for the mold. The foot J strikes the carriage and imparts a blow to the side $d$ of the mold, thus displacing or loosening the said side, whereby the contents of the mold may be readily removed, the molded material falling from the mold on a platform, apron, or other locality, as desired or required. The mold, continuing its motion with the carriage, reaches the obliquely-arranged roller F', and its bottom rides up the same, thus elevating the mold and restoring it to its normal horizontal position on the carriage, whereby it may be refilled.

The filling of the mold may be accomplished when the mold is on the carriage, intermittent motion then being imparted to the latter, or when removed therefrom, and reapplied while the carriage is running, the motion whereof being continuous, if desired.

Each side of the mold may be movable, in which case a fixed side will be secured to the mold outside of the movable side, and the feet may be connected, so that when the outer foot strikes the carriage when tilted the several movable sides of the mold may be simultaneously operated, thus relieving the molded material on each side and insuring the removal of the same from the mold.

In the present case I make the blocks from blast-furnace slag; but I do not limit myself to material.

Having thus described my invention, what I claim as new, and desire to secure by Letters Patent, is—

1. In a machine for making blocks for paving, building, &c., a carriage in combination with a roller, whereby the mold may be tilted, substantially as and for the purpose set forth.

2. In a machine for making blocks for paving, building, &c., a carriage in combination with a roller, whereby the mold may be restored to its normal position, substantially as and for the purpose set forth.

3. A carriage, mold, and conical roller, combined and operating substantially as and for the purpose set forth.

4. A carriage, mold, and obliquely-arranged roller, combined and operating substantially as and for the purpose set forth.

5. A carriage, mold, conical roller, and obliquely-arranged roller, combined and operating substantially as and for the purpose set forth.

6. A tilting mold formed with depending hooks, which, when the mold is tilted, are adapted to engage with the supporting-carriage and sustain the mold, substantially as and for the purpose set forth.

7. A mold formed with a movable side and a fixed side outside of the same, substantially as and for the purpose set forth.

8. A mold having a movable side and a foot for operating said side, substantially as and for the purpose set forth.

9. A carriage, in combination with a mold having a movable side and a foot which, when the mold is tilted, strikes the carriage and releases said side, substantially as and for the purpose set forth.

CHAS. DIEBOLD.

Witnesses:
 A. FRANK SELTZER,
 S. H. BENTZ.